T. B. Pyron,
Horse Power.
No. 106,505. Patented Aug. 16, 1870.

Witnesses:
Cha. Kenyon.
Edw. P. Mast.

Inventor:
T. B. Pyron
Chipman, Hosmer & Co.
Attys.

United States Patent Office.

TAPLEY B. PYRON, OF SPRINGFIELD, MISSOURI.

Letters Patent No. 106,505, dated August 16, 1870.

IMPROVEMENT IN HORSE-POWER.

The Schedule referred to in these Letters Patent and making part of the same

*To all whom it may concern:*

Be it known that I, TAPLEY B. PYRON, of Springfield, in the county of Greene and State of Missouri, have invented a new and valuable Improvement in Horse-Power; and I do hereby declare that the following is a full, clear, and exact description of the construction and operation of the same, reference being had to the annexed drawing making part of this specification, and to the letters and figures of reference marked thereon.

Figure 1:
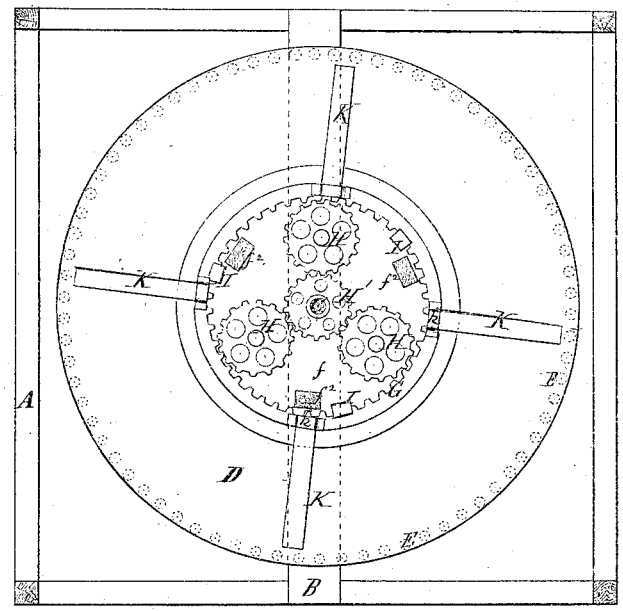

Figure 1 of the drawing is a representation of a horizontal section, showing a plan of the platform and gearing.

Figure 2:
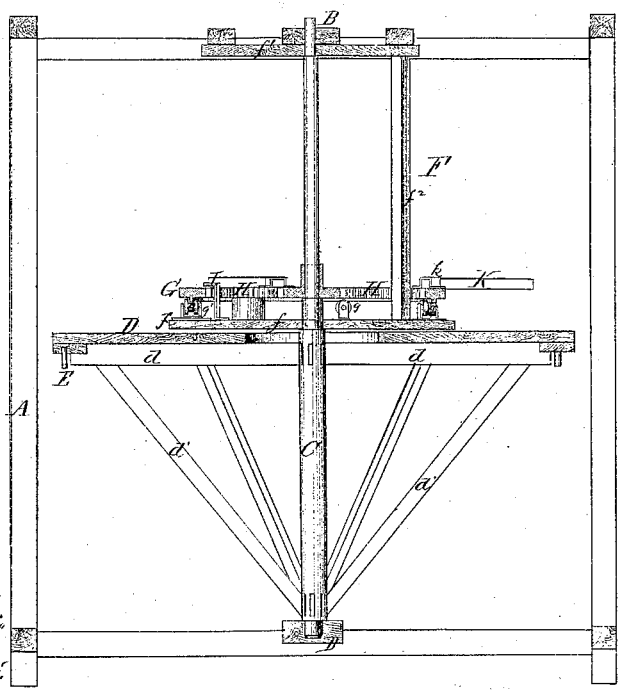

Figure 2 is a vertical central section.

My invention relates to the employment, in connection with an internally-toothed spur-wheel, operating a series of pinions within its rim, of a horizontal, traversible platform, arranged to rotate with the vertical shaft, in an opposite direction from the spur-wheel, to which the horses are hitched.

The object of the invention is to secure speed and lessen the draft.

In the accompanying drawing—

A represents the main frame of the device, composed of strong corner uprights, secured firmly by proper cross-timbers.

B are bars extending midway across the top and bottom of the frame A, and having journaled in them the ends of a vertical shaft, C.

D represents the rotating, horizontally-arranged platform, which the horses traverse while working the machine. This platform is situated at any suitable point between the ends of the shaft C, to which it is secured very firmly by the series of radial horizontal bars $d$, and radial diagonal bars $d'$, attached to the platform and shaft by mortises and tenons, or other proper fastenings.

E is a circular row of teeth, projecting from the under side of the platform D, near its edge, and designed to gear with such machinery as the device is intended to operate.

F represents an inner frame, consisting of the lower platform $f$, upper platform or cross-bars $f^1$, and vertical supports $f^2$, the whole constructed and arranged as shown in the drawing, to revolve around the shaft C.

G is an internally-toothed spur-wheel, supported above the platform $f$ by friction-wheels $g$, journaled in brackets $g'$, which are secured to said platform near its edge.

Around the under side of the rim of the spur-wheel is formed a ridge or track, which fits within corresponding grooves in the friction-wheels.

H H H are pinions, arranged within the rim of the spur-wheel, with which they gear. These pinions are journaled in blocks or boxes, $h$, secured to the platform G.

H' represents a pinion, rigidly attached to the shaft C, and gearing with the series of pinions H.

I are flanged guides, secured to the platform $f$, and intended to prevent lateral play of the spur-wheel.

K are the draft-poles, to which the horses are hitched, and the ends of which fit in sockets, $k$, arranged on the rim of the spur-wheel.

The horses being hitched to the draft-poles, rotate the spur-wheel, and, by means of the pushing motion of their feet, communicate contrary rotation to the platform D, thereby making use of all the power of the horses, and securing considerable speed, to be increased by the application of other gear to the teeth of the platform.

The gait of the horses may be slower than is necessary in ordinary cases, when the track is stationary, while the traversible area of the platform may be comparatively small.

The relation between the internal wheel G and the movable platform is established by means of the stationary pinions H H, through the pinion H' on the shaft.

What I claim as my invention, and desire to secure by Letters Patent, is—

1. In horse-powers, traversible platform, secured rigidly to the main shaft, and arranged to rotate in a direction contrary to that of the draft, as specified.

2. In combination, the platform D, provided with the teeth E, the shaft C, having the spur-wheel H, the stationary inner frame $f$, provided with the gear-wheels H, guides I, and grooved rollers $g$, and the internal wheel G, provided with a bearing-rib, substantially as shown and described.

In testimony that I claim the above, I have hereunto subscribed my name in the presence of two witnesses.

T. B. PYRON.

Witnesses:
 D. D. KANE,
 EDWD. P. MASI